United States Patent [19]
Ôkawa et al.

[11] Patent Number: 4,593,008
[45] Date of Patent: Jun. 3, 1986

[54] DIELECTRIC CERAMIC MATERIAL COMPOSITION

[75] Inventors: Takashi Ôkawa, Kokubu; Nobuo Yokoe, Hayato, both of Japan

[73] Assignee: Kyocera Corporation, Japan

[21] Appl. No.: 768,620

[22] Filed: Aug. 23, 1985

[51] Int. Cl.$^4$ .................. C04B 35/50; C04B 35/00
[52] U.S. Cl. .................................................. 501/135
[58] Field of Search ..................... 501/135; 252/63.2

[56] References Cited

U.S. PATENT DOCUMENTS 3,775,142  11/1973  Roup ..................................... 501/136

FOREIGN PATENT DOCUMENTS 54-124299  9/1979  Japan .................................. 501/135
56-82501   7/1981  Japan .................................. 501/135
60-56306   4/1985  Japan .................................. 501/135
596557     2/1978  U.S.S.R. ............................. 501/135

Primary Examiner—Mark L. Bell
Attorney, Agent, or Firm—Spensley Horn Jubas & Lubitz

[57] ABSTRACT

Disclosed is a dielectric material composition having the following composition formula:

$$Ba(Nd_{x/2}La_{y/2}Y_{z/2}Nb_{\frac{1}{2}})O_3 \qquad (1)$$

wherein x, y and z are positive numbers satisfying requirements of $x+y+z=1$, $1 \geq x \geq 0$, $1 \geq y \geq 0$ and $1 > z \geq 0$, and having a perovskite structure.

This dielectric material composition has a large permittivity, a low dielectric loss and a small temperature coefficient of the resonance frequency, and is valuable as a microwave dielectric material.

7 Claims, 3 Drawing Figures

DIELECTRIC CERAMIC MATERIAL COMPOSITION

BACKGROUND OF THE INVENTION

1. Field of the Invention

The present invention relates to a dielectric ceramic material composition having a perovskite crystal structure. More particularly, the present invention relates to a composition which has a relatively large permittivity, a low dielectric loss and a small temperature coefficient of the resonance frequency.

2. Description of the Prior Art

Dielectric material are widely used in the microwave regions in various processes in a car telephone or personal wireless installation which has recently been put into practical use, a microwave circuit which is now integrated and a gun oscillator. These microwave dielectric material are mainly used for resonators, and they are required to have the following three characteristics.

(1) Since the wavelength is shortened to $1/\sqrt{\epsilon}$ ($\epsilon$=dielectric constant) in a dielectric, the dielectric constant should be sufficiently large to comply with the requirement of reduction of the size.

(2) The dielectric loss at a high frequency should be small.

(3) The change of the resonance frequency by the temperature should be small. That is, the temperature dependency of the dielectric constant should be small and the dielectric constant should be stable.

As the dielectric material of this type, there are known a material of the $BaO-TiO_2$ type, a material of the $ReO-BaO-TiO_2$ type and a material of the $(BaSrCa)(ZrTi)O_3$ type.

In the material of the $BaO-TiO_2$ type, the dielectric constant $\epsilon r$ is high and 38 to 40, and though the dielectric loss $\tan \delta$ is small and less than $2.00 \times 10^{-4}$, a product in which the temperature coefficient $\tau f$ of the resonance frequency is 0 can hardly be obtained in the single phase. Furthermore, changes of the dielectric constant and the temperature dependency of the permittivity by the change of the composition are large. Therefore, it is difficult to control the temperature coefficient ($\tau f$) of the resonance frequency to a low level stably while maintaining a high permittivity and a low dielectric loss. In the material of the $ReO-BaO-TiO_2$ type, the dielectric constant $\epsilon r$ is very high and 40 to 60, and a product in which the temperature coefficient $\epsilon f$ of the resonance frequency is 0 can be obtained. However, the dielectric loss $\tan \delta$ is very large and exceeds $5.0 \times 10^{-4}$. In the material of the $(BaSrCa)(ZrTi)O_3$ type, the dielectric loss $\tan \delta$ is small and less than $2.00 \times 10^{-4}$ and a product in which the temperature coefficient $\tau f$ of the resonance frequency is 0 can be obtained. However, the dielectric constant $\epsilon r$ is very small and is 29 to 32. Incidentally, the dielectric loss ($\tan \delta$) referred to in the instant specification is one determined at 500 to 600 MHz according to the re-extrant resonator method.

As is apparent from the foregoing description, none of the above-mentioned known materials have characteristics fully satisfying all of the above three requirements.

SUMMARY OF THE INVENTION

We found that if a dielectric having a perovskite structure is formed from a composition comprising (a) barium oxide (BaO), (b) niobium oxide ($Nb_2O_5$) and (c) at least one member selected from neodium oxide ($Nd_2O_3$), lanthanum oxide ($La_2O_3$) and yttrium oxide ($Y_2O_3$), a microwave dielectric material having characteristics satisfying all of the above three requirements can be obtained.

It is therefore a primary object of the present invention to provide a dielectric material composition having a relatively high permittivity, a low dielectric loss and a small and stable temperature dependency of the permittivity, which is characterized in that when it is used for a dielectric resonator, the temperature dependency of the resonance frequency is maintained at a low level.

More specifically, in accordance with the present invention, there is provided a dielectric material composition having the following composition formula:

$$Ba(Nd_{x/2}La_{y/2}Y_{z/2}Nb_{\frac{1}{2}})O_3 \qquad (1)$$

wherein x, y and z are positive numbers satisfying requirements of $x+y+z=1$, $1 \geq x \geq 0$, $1 \geq y \geq 0$ and $1 > z \geq 0$, and having a perovskite structure.

DETAILED DESCRIPTION OF THE PREFERRED EMBODIMENTS

Figure 1:
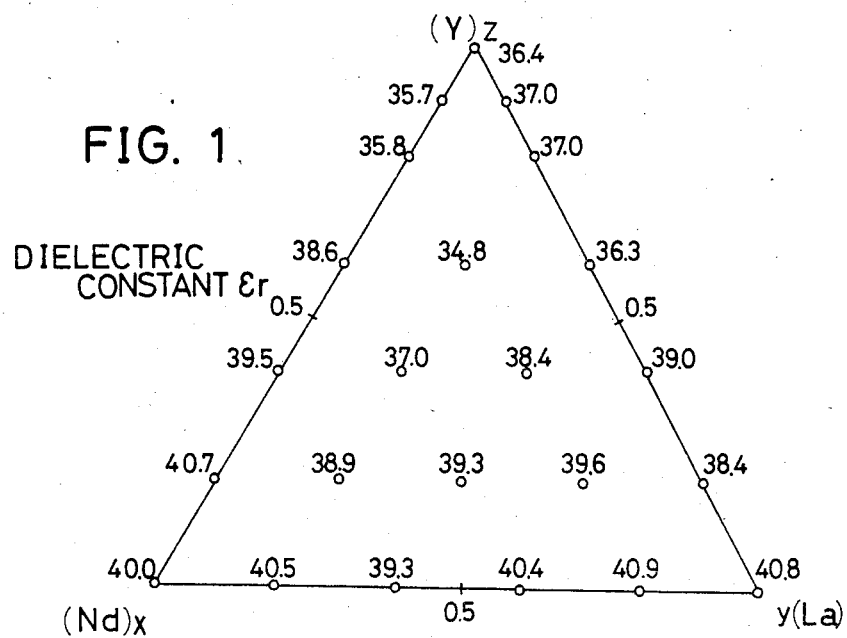
FIGS. 1, 2 and 3 are ternary diagrams in which values of the dielectric constant, the dielectric loss and the temperature coefficient of the resonance frequency are plotted according to x, y and z of the composition formula (1) in the example given hereinafter.

As pointed out hereinbefore, the present invention is based on the finding that BaO, $Nb_2O_5$ and at least one rare earth element oxide selected from $Nd_2O_3$, $La_2O_3$ and $Y_2O_3$ form a perovskite crystal structure and this material composition has all of the above-mentioned characteristics required for a microwave dielectric material.

More specifically, this material composition is characterized in that (1) the dielectric constant ($\epsilon r$) is relatively high and is about 36 to about 41, (2) the dielectric loss ($\tan \delta$) is very small and is $1.67 \times 10^{-4}$ to $4.88 \times 10^{-4}$, and (3) by changing the values of x, y and z in the composition formula (1), the temperature coefficient f of the resonance frequency can be controlled to form $-104.1$ to $+100$ ppm/°C. (ppm indicates $10^{-6}$).

If the ratio of BaO, $Nb_2O_5$ and the rare earth element oxide deviates from the above-mentioned range, the perovskite structure is destroyed and the material composition is not of the single phase, and the dielectric characteristics are degraded. As the rare earth element oxide, there is used at least one member selected from $Nd_2O_3$, $La_2O_3$ and $Y_2O_3$. When $Y_2O_3$ alone is used, that is, when z is equal to 1, the temperature coefficient of the resonance frequency is increased on the plus side and becomes 144 ppm/°C., and the composition is not practical.

It is preferred that the absolute value $|\tau f|$ of the temperature coefficient ($\tau f$) of the resonance frequency be 50 or smaller, and in order to make the temperature coefficient of the resonance frequency as small as possible, a two-component or three-component composition in which x is from 0 to 0.7, y is from 0 to 0.9 and z is from 0.1 to 0.85 in the above formula (1), a two-component or three-component composition in which x is from 0 to 0.1, y is from 0.05 to 0.15 and z is from 0.85 to 0.95 in the formula (1), and a one-component, two-component or three-component composition in which x is from 0 to 0.15, y is from 0.75 to 1 and z is from 0 to 0.1 in the above formula (1), are preferred.

In case of a microwave dielectric material to be used for a duplexer such as a personal wireless installation, it is preferred that the absolute value $|\tau f|$ of the temperature coefficient ($\tau f$) of the resonance frequency be 20 or smaller. In order to satisfy this requirement, a composition in which x is from 0 to 0.6, y is from 0.2 to 0.8 and z is from 0.2 to 0.6 in the above formula (1) is preferred.

A three-component composition in which x is from 0.3 to 0.8, y is from 0.1 to 0.6 and z is from 0.1 to 0.6 in the above formula (1) and a two-component or three-component composition in which x is from 0 to 0.1, y is from 0.3 to 0.9 and z is from 0.1 to 0.7 in the above formula (1) are preferred for obtaining a desirable combination of the dielectric constant ($\epsilon r$), the dielectric loss (tan $\delta$) and the temperature coefficient ($\tau f$) of the resonance frequency.

The dielectric material composition of the present invention is obtained by mixing oxides, hydroxides and/or carbonates of the above-mentioned components in predetermined amounts, finely pulverizing the mixture by the wet or dry method, calcining the mixture if necessary, molding the mixture into a predetermined shape and sintering the molded mixture at a temperature of 1400° to 1700° C. to form a perovskite structure. In this method, instead of steps of molding the finely pulverized mixture and sintering the molded mixture, there may be adopted steps of forming a mixed solution of water-soluble salts, such as nitrates and hydrochlorides, of the respective components, adding an alkali to the solution to form a precipitate having the above composition and sintering the coprecipitate. Moreover, alkoxides of the respective components can be used.

At the molding step, there may be adopted molding methods customarily used in the manufacture of ceramics, such as the press molding method and the doctor blade method. According to the press molding method, a composition of the respective components, in which water or the like is incorporated, is filled in a press mold, the composition is compressed under a pressure of 700 to 900 kg/cm$^2$, and the resulting molded body is sintered to form a dielectric ceramic. According to the doctor blade method, a composition of the respective components, in which water, a binder such as polyvinyl alcohol, polyethylene glycol, starch or acrylic resin, or a wax is incorporated, is coated on an appropriate film substrate to form a green sheet having a predetermined thickness, a plurality of such green sheets are piled and compressed to form a predetermined laminate, and this laminate is sintered to form a dielectric material.

In the case where the above-mentioned doctor blade method is adopted, water, the binder such as polyvinyl alcohol, polyethylene glycol, starch or acrylic resin, or the wax is used in an amount of 0.5 to 10.0% by weight based on the composition.

The present invention will now be described in detail with reference to the following example that by no means limits the scope of the invention.

EXAMPLE

Preparation of Samples

Barium carbonate (BaCO$_3$), neodium oxide (Nd$_2$O$_3$), lanthanum oxide (La$_2$O$_3$), yttrium oxide (Y$_2$O$_3$) and niobium oxide (Nb$_2$O$_5$), each having a high purity, were weighed and mixed so that the values x, y and z of the composition formula (1) were as shown in Table 1, and the mixture was wet-blended overnight by using agate balls and dried. The mixture was calcined at 1300° C. for 2 hours, and a binder was added to the calcined mixture in an amount of about 1% by weight. Then, the mixture was sieved and the obtained powder was moled under a pressure of about 800 kg/cm$^2$. The molded green body was sintered in air at a temperature of 1400° to 1700° C. for 2 hours.

Method of Measurement of Characteristics of Samples

With respect to each of the obtained samples, the dielectric constant, the dielectric loss and the temperature coefficient of the resonance frequency were measured by using a re-entrant resonant. The obtained results are shown in Table 1.

TABLE 1

| Sample No. | Composition x | y | z | Dielectric constant $\epsilon r$ | Dielectric Loss (tan $\delta$) | Temperature Coefficient $\tau f$ (ppm/°C.) |
|---|---|---|---|---|---|---|
| 1 | 1.0 | 0 | 0 | 40.0 | 1.95 × 10$^{-4}$ | −74.0 |
| 2 | 0.8 | 0.2 | 0 | 40.5 | 2.78 × 10$^{-4}$ | −63.7 |
| 3 | 0.6 | 0.4 | 0 | 39.3 | 2.96 × 10$^{-4}$ | −104.1 |
| 4 | 0.4 | 0.6 | 0 | 40.4 | 4.17 × 10$^{-4}$ | −66.5 |
| 5 | 0.2 | 0.8 | 0 | 40.9 | 4.88 × 10$^{-4}$ | −51.9 |
| 6 | 0 | 1.0 | 0 | 40.8 | 1.89 × 10$^{-4}$ | −50.0 |
| 7 | 0.8 | 0 | 0.2 | 40.7 | 1.92 × 10$^{-4}$ | −102.5 |
| 8 | 0.6 | 0.2 | 0.2 | 38.9 | 2.60 × 10$^{-4}$ | −11.0 |
| 9 | 0.4 | 0.4 | 0.2 | 39.3 | 3.65 × 10$^{-4}$ | +9.0 |
| 10 | 0.2 | 0.6 | 0.2 | 39.6 | 3.76 × 10$^{-4}$ | +19.0 |
| 11 | 0 | 0.8 | 0.2 | 38.4 | 1.95 × 10$^{-4}$ | +8.2 |
| 12 | 0.6 | 0 | 0.4 | 39.5 | 2.21 × 10$^{-4}$ | −34.0 |
| 13 | 0.4 | 0.2 | 0.4 | 37.0 | 2.99 × 10$^{-4}$ | −5.6 |
| 14 | 0.2 | 0.4 | 0.4 | 38.4 | 4.01 × 10$^{-4}$ | +10.7 |
| 15 | 0 | 0.6 | 0.4 | 39.0 | 2.88 × 10$^{-4}$ | −1.2 |
| 16 | 0.4 | 0 | 0.6 | 38.6 | 2.68 × 10$^{-4}$ | −33.0 |
| 17 | 0.2 | 0.2 | 0.6 | 35.8 | 3.68 × 10$^{-4}$ | −9.9 |
| 18 | 0 | 0.4 | 0.6 | 36.3 | 3.61 × 10$^{-4}$ | −6.7 |
| 19 | 0.2 | 0 | 0.8 | 35.8 | 1.67 × 10$^{-4}$ | −44.2 |
| 20 | 0 | 0.2 | 0.8 | 37.0 | 2.83 × 10$^{-4}$ | −23.7 |
| 21 | 0.1 | 0 | 0.9 | 35.7 | 4.04 × 10$^{-4}$ | +73.3 |
| 22 | 0 | 0.1 | 0.9 | 37.0 | 2.62 × 10$^{-4}$ | +29.5 |
| *23 | 0 | 0 | 1.0 | 36.4 | 2.94 × 10$^{-4}$ | +144.4 |

Note
*outside the scope of the present invention

Sample Nos. 1 through 22 in Table 1 are represented by the following composition formula of the present invention:

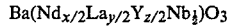

$$Ba(Nd_{x/2}La_{y/2}Y_{z/2}Nb_{\frac{1}{2}})O_3$$

wherein x, y and z are positive numbers satisfying the requirements of $x+y+z=1$, $0 \leq x \leq 1$, $0 \leq y \leq 1$ and $0 \leq z < 1$, and they are within the scope of the present invention and the temperature coefficient $\tau f$ (ppm/°C.) of the resonance frequency is controlled in these samples. On the other hand, in sample No. 23, z is equal to 1, and this sample deviates slightly from the scope of the present invention. In each of samples Nos. 1 thorugh 22, the dielectric constant ($\epsilon r$) is relatively high and 35.8 to 40.9, and the dielectric loss (tan $\delta$) is very low and $1.67 \times 10^{-4}$ to $4.88 \times 10^{-4}$. Moreover, by changing the values x, y and z in the composition formula, the temperature coefficient ($\tau f$) of the resonance frequency can be easily controlled within the range of from −104.1 to +100 ppm/°C. Moreover, by appropriately selecting the values x, y and z, it is possible to change only the temperature coefficient of the resonance frequency while keeping the dielectric constant or dielectric loss constant. Incidentally, in sample No. 23 where z is equal to 1, the temperature coefficient is too large and +144.4 ppm/°C., and this sample is not practically used.

Figure 2:
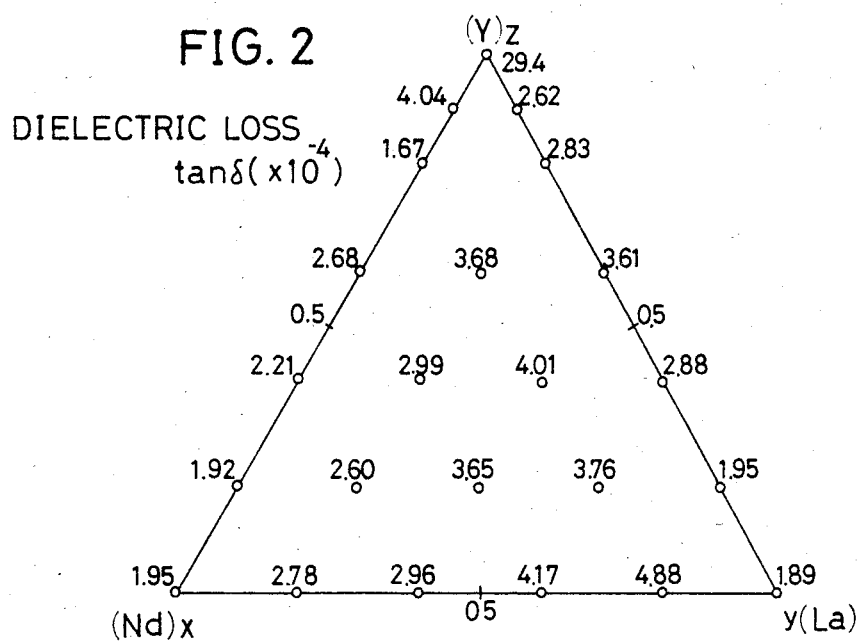
Figure 3:
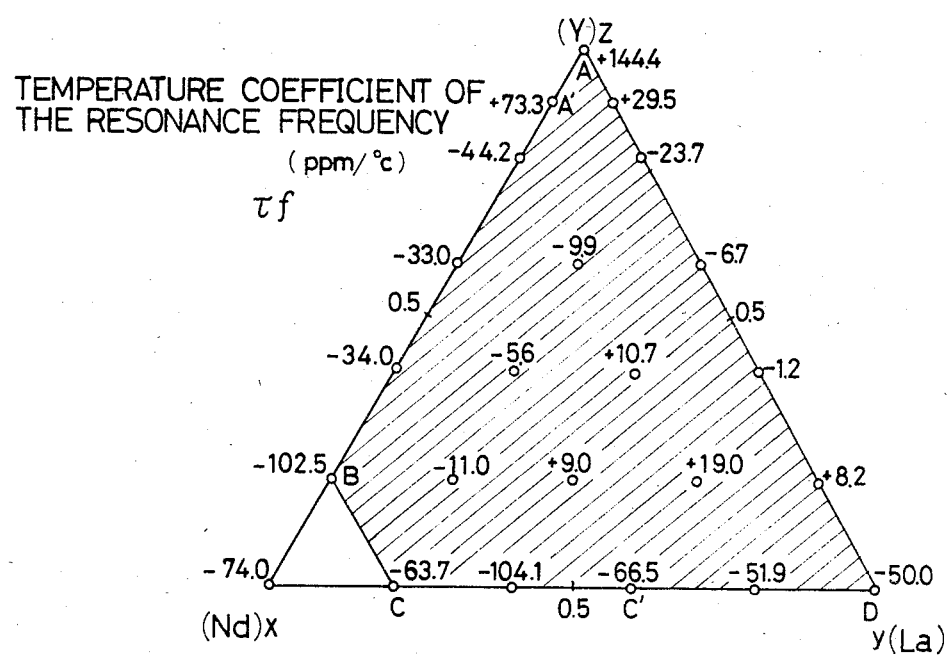

FIGS. 1, 2 and 3 are ternary diagrams illustrating the dielectric constant ($\epsilon r$), the dielectric loss (tan $\delta$) and the temperature coefficient ($\tau f$) of the resonance frequency according to specific values of x, y and z in the example. In the hatched region surrounded by A, B, C, D and E except line segments AA', BC and CC', the temperature coefficient of the resonance frequency is especially small and good dielectric material can be obtained. Moreover, in this region, by appropriately selecting the values of x, y and z, it is possible to change only the temperature coefficient of the resonance frequency while keeping the dielectric constant or the dielectric loss constant, and it is understood that microwave dielectric material having especially preferred characteristics can be obtained in the region specified in the present invention.

As is apparent from the foregoing description, according to the present invention, there is provided a dielectric material composition having the following composition formula:

$$Ba(Nd_{x/2}La_{y/2}Y_{z/2}Nb_{\frac{1}{2}})O_3$$

wherein x, y and z are positive numbers satisfying the requirements of $x+y+z=1$, $0\leq x\leq 1$, $0\leq y\leq 1$ and $0\leq z<1$, and having a perovskite structure, which has all of the following three characteristics required for a microwave dielectric material:

(1) the dielectric constant is relatively high;
(2) the dielectric loss is small; and
(3) control of the temperature dependency of the resonance frequency can be easily done.

We claim:

1. A dielectric material composition having the following composition formula:

$$Ba(Nd_{x/2}La_{y/2}Y_{z/2}Nb_{\frac{1}{2}})O_3 \quad (1)$$

wherein x, y and z are positive numbers satisfying requirements of $x+y+z=1$, $1\geq x\geq 0$, $1\geq y\geq 0$ and $1>z\geq 0$, and having a perovskite structure.

2. A dielectric material composition as set forth in claim 1, wherein in the composition formula, x is from 0 to 0.7, y is from 0 to 0.9 and z is from 0.1 to 0.85.

3. A dielectric material composition as set forth in claim 1, wherein in the composition formula, x is from 0 to 0.1, y is from 0.05 to 0.15 and z is from 0.85 to 0.95.

4. A dielectric material composition as set forth in claim 1, wherein in the composition formula, x is from 0 to 0.15, y is from 0.75 to 1 and z is from 0 to 0.1.

5. A dielectric material composition as set forth in claim 1, wherein in the composition formula, x is from 0 to 0.6, y is from 0.2 to 0.8 and z is from 0.2 to 0.6.

6. A dielectric material composition as set forth in claim 1, wherein in the composition formula, x is from 0.3 to 0.8, y is from 0.1 to 0.6 and z is from 0.1 to 0.6.

7. A dielectric material composition as set forth in claim 1, wherein in the composition formula, x is from 0 to 0.1, y is from 0.3 to 0.9 and z is from 0.1 to 0.7.

* * * * *

UNITED STATES PATENT AND TRADEMARK OFFICE
CERTIFICATE OF CORRECTION

PATENT NO. : 4,593,008

DATED : June 3, 1986

INVENTOR(S) : Takashi Okawa; Nobuo Yokoe

It is certified that error appears in the above-identified patent and that said Letters Patent is hereby corrected as shown below:

Title page, the following should be inserted:

-- [30] Foreign Application Priority Data

Aug. 25, 1984 [JP]   Japan          177270/84 --

*Signed and Sealed this*

*Twenty-third* Day of *September 1986*

[SEAL]

Attest:

DONALD J. QUIGG

*Attesting Officer*   *Commissioner of Patents and Trademarks*